United States Patent
Doty

[19]

[11] Patent Number: 5,841,537
[45] Date of Patent: Nov. 24, 1998

[54] SYNTHESIZED ATTITUDE AND HEADING INERTIAL REFERENCE

[75] Inventor: James H. Doty, Cedar Rapids, Iowa

[73] Assignee: Rockwell International, Costa Mesa, Calif.

[21] Appl. No.: 909,479

[22] Filed: Aug. 11, 1997

[51] Int. Cl.$^6$ .................................................. G01C 19/66
[52] U.S. Cl. .......................................... 356/350; 701/221
[58] Field of Search ........................... 356/350; 364/184, 364/187; 701/220; 702/221

[56] References Cited

U.S. PATENT DOCUMENTS

| | | | |
|---|---|---|---|
| 5,166,882 | 11/1992 | Stambaugh | 701/220 |
| 5,184,304 | 2/1993 | Huddle | 701/220 |
| 5,383,127 | 1/1995 | Shibata | 701/221 |
| 5,719,764 | 2/1998 | McClary | 364/184 |

*Primary Examiner*—Samuel A. Turner
*Attorney, Agent, or Firm*—Kyle Eppele; James P. O'Shaughnessy

[57] ABSTRACT

An inertial reference system for determining the attitude and rate of change of attitude of a vehicle such as an aircraft is disclosed. Redundancy of the inertial reference system may be accomplished by replacement of one of the fiber optic gyroscopes of an otherwise dual fiber optic gyros installation with a low-cost reference IMU. Failure detection and isolation of a fiber optic gyroscope system may be accomplished with a low-cost reference IMU rather than with an additional fiber optic gyroscope. The information provided by the eliminated fiber optic gyroscope is synthesized from the output of the remaining fiber optic gyroscope and the output of the low-cost reference IMU.

6 Claims, 3 Drawing Sheets

SYNTHESIZED ATTITUDE AND HEADING INERTIAL REFERENCE

BACKGROUND OF THE INVENTION

In recent years the aviation industry has continued its attempt to reduce cost and improve performance of avionics systems while maintaining or improving the level of safety. One particular area in which avionics engineers have expended much effort and achieved many successes is in the substitution of completely solid state electronic systems for the conventional mechanical systems of the past. A prime example of these efforts is in the area of inertial navigation systems.

Gyroscopes and accelerometers have been utilized in avionics inertial navigation systems to provide information concerning the orientation of the airplane with respect to a reference plane, typically the local level ground coordinates. Avionics display and flight control attitude, heading, rotation rate, and acceleration data to provide angular speed information regarding changes in the plane's orientation. This information is typically provided by an attitude heading reference system (AHRS). Modern, state of the art, AHRS systems utilize precision solid state inertial sensors to measure rotation rates, in place of the spinning wheel gyroscopes and spring-and-mass mechanical accelerometers used in older systems. These precision solid state inertial sensors may include fiber optic rotation sensors also referred to as fiber optic gyros and quartz or silicon micromachined accelerometers. For example, U.S. Pat. No. 5,606,415 describes such a solid state fiber optic gyro capable of the accuracy required for AHRS applications, and high accuracy quartz accelerometers are commercially available. Other sensor technologies may also be used, in AHRS applications, such as the micromachined quartz gyros, which are also commercially available.

Because the data from the AHRS is utilized by flight critical systems such as displays and flight controls, integrity of the AHRS data is also critical. Any hazardously misleading data from the AHRS must be detected in some way. Although solid state inertial sensors such as FOGs have higher reliability than earlier mechanical gyro based systems, their probability of failure is often still too high for safety critical systems, so their faults must be detected in some way.

Traditionally aircraft have utilized redundant AHRS systems to allow fault detection. The output of two or more AHRS systems is compared and any discrepancy in the data, outside of certain predefined safe bounds, will result in an error condition state. The flight critical systems then take appropriate action to minimize the hazard from such a fault such as warning the pilot, or disengaging the autopilot. In this way AHRS system redundancy is utilized to ensure detection of critical faults.

An alternative approach to redundant AHRS systems is to utilize redundant sensor or sensors inside of a high reliability system. In such a system one or more redundant precision sensors is utilized inside of the high reliability system to detect faults. The outputs of the redundant sensors are compared with the outputs of the primary sensors and a fault is flagged if the output data is not consistent. Often in this type of system, a single sensor may be used to detect faults on multiple sensors by skewing the redundant sensor's sensitive axis such that it will detect a component of all three of the primary sensors' axes. With proper design a single sensor may be used to detect all but a small pathological set of simultaneous sensor failures.

However, the above approaches of increasing system redundancy directly increases the cost of the navigation system. Redundancy necessitates adding at least one more precision sensor than is required for fault free operation. Typically, it would be desirable to provide an aircraft with two or three individual attitude and heading reference systems (AHRS) each utilizing precision sensors to provide accurate angular and translational movement information. However, small aircraft customers often cannot afford a dual or triple AHRS installations, but still want (need) a secondary inertial reference source for fault detection.

There is a need for a low-cost secondary inertial reference source which does not utilize high cost precision inertial sensors such as FOG. To date, there have been attempts to synthesize a secondary attitude source using a technique known as analytic redundancy. This technique seeks to estimate the attitude of the aircraft by utilizing other available information such as airspeed, pressure altitude and altitude rate of change, magnetic heading, or GPS position. By combining these measurements with a model of the aircraft dynamics an estimate can be made of the aircraft's attitude. For example, if the pressure altitude is increasing, the aircraft should be in a nose-up attitude. The attitude will be a function of the air speed and altitude, as well as other factors such as aircraft total weight. Unfortunately, achieving an accurate estimate of an aircraft's attitude can be very difficult. Careful calibration and modeling of the aircraft's flight dynamics is required, under a wide range of flight conditions, to achieve a reasonable level of accuracy.

Even with extensive calibration, the short-term accuracy of analytic redundancy may still be inadequate due to perturbations in the flight profile caused by turbulence or other factors. Systems utilizing analytic redundancy will typically have too many false error detection events due to turbulence. To reduce false error detection the attitude comparison criteria are often "opened up" requiring longer or larger attitude discrepancies to trigger fault detection. Opening up the attitude comparison criteria often compromises the safety of the system because it will take longer to detect faults in the AHRS. So-called Hard-over faults, in which the AHRS has rapidly increasing attitude errors, or even slow-over errors, in which the AHRS attitude error grows more slowly, may not be detected in time to prevent dangerous (or at least inconvenient) deviations in flight control or displayed attitude. There is a still a need for a low-cost secondary inertial reference source that has the short-term accuracy required to detect hard-over and slow-over faults in an AHRS system, without requiring costly precision inertial sensors.

SUMMARY OF THE INVENTION

The present invention provides utilization of a reduced number of traditional attitude and heading reference systems by replacing at least one of the redundant AHRS systems with a lower cost IMU.

The present invention additionally provides standby operation of the attitude and heading reference navigation systems.

The present invention provides reduction in cost and in weight of avionics navigation an inertial reference systems.

The right side attitude and heading reference information is electronically synthesized by utilizing the primary AHRS information in conjunction with reference IMU information. The secondary channel information is synthesized electronically rather than actually being directly measured. For example in a typical small aircraft with left and right side avionics, this approach replaces the right side AHRS with a low-cost IMU and a system for correction of long term bias and attitude errors. The system allows for detection of both hard-over (rapidly increasing attitude errors due to large rate errors in the gyros) and slow-over errors (more gradual attitude errors caused by smaller rate errors in the gyros) in the AHRS. A third class of faults, known as very-slow-over attitude errors, consists of a very gradual buildup of attitude error. These errors may be due to faults in the AHRS leveling algorithms (the technique used to correct for long-term drift in the precision gyros by utilizing the level component of acceleration) accelerometer faults, or gyro faults that are partially corrected by the leveling algorithm. Very-slow-over faults may be detected with a reading from an alternate right side attitude indicator, with a level detection device such as a bubble level or electrolytic tilt sensor, or by utilizing analytic redundancy techniques.

Wherein the above description of the invention refers to attitude systems this is more exemplary and the invention may be applied to a wide range of safety critical applications in a number of fields. For example the invention may be applied to pressure sensor systems such as aircraft altimeters. The AHRS in the example system may be replaced by a precision air data systems and the reference IMU replaced by a low-cost pressure sensor system. Again the system can be used to detect short-term failures of the air data system while correcting for the long-term errors of the low-cost pressure sensor system. This type of fault detection system could be useful in systems that utilize air data in high dynamics safety-critical systems such as flight control stabilization systems in high performance aircraft.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to the presently preferred embodiment of the invention, an example of which is illustrated in the accompanying drawings.

Figure 1:
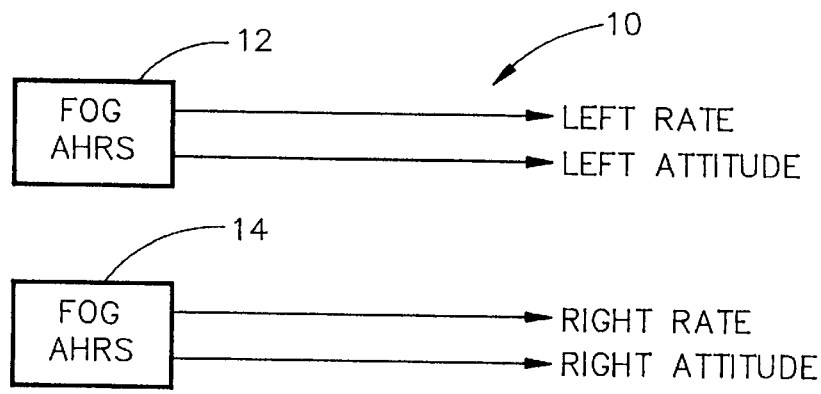
FIG. 1 shows a dual fiber optic gyroscope based inertial system.

Referring now to FIG. 1, a dual fiber optic gyroscope system 10 is shown. Typically, two independent attitude and heading reference systems ("FOG AHRS") (12, 14) are utilized to provide independent inertial information. Having two or more independent FOG AHRS systems provides redundancy in the case of failure and provides verification that the inertial navigation system is properly operating. With three or more independent FOG AHRS systems, a failed system may be isolated (e.g., shut down) by comparison with the outputs of at least two other FOG AHRS systems. After a first fault, in a three-AHRS system, there are still two AHRS available so that fault detection may be continued after one AHRS failure. Each FOG AHRS system (12, 14) utilizes three fiber optic gyroscopes to directly provide attitude and rate of change of attitude about three independent directional axes of the aircraft, and may also have accelerometers to measure accelerations along the three directional axes. For example, a first FOG AHRS system 12 may provide inertial information for the left side of the aircraft ("LEFT RATE", "LEFT ATTITUDE") and a second FOG AHRS system 14 may provide inertial information for the right side of the aircraft ("RIGHT RATE", "RIGHT ATTITUDE"). The present invention replaces at least one of the FOG AHRS systems with a lower cost reference IMU system. The attitude and rate of change of attitude information that would have been provided by the eliminated FOG AHRS may be synthesized from the output of the remaining FOG AHRS and from the output of a reference inertial measuring unit (see FIG. 2.).

Figure 2:
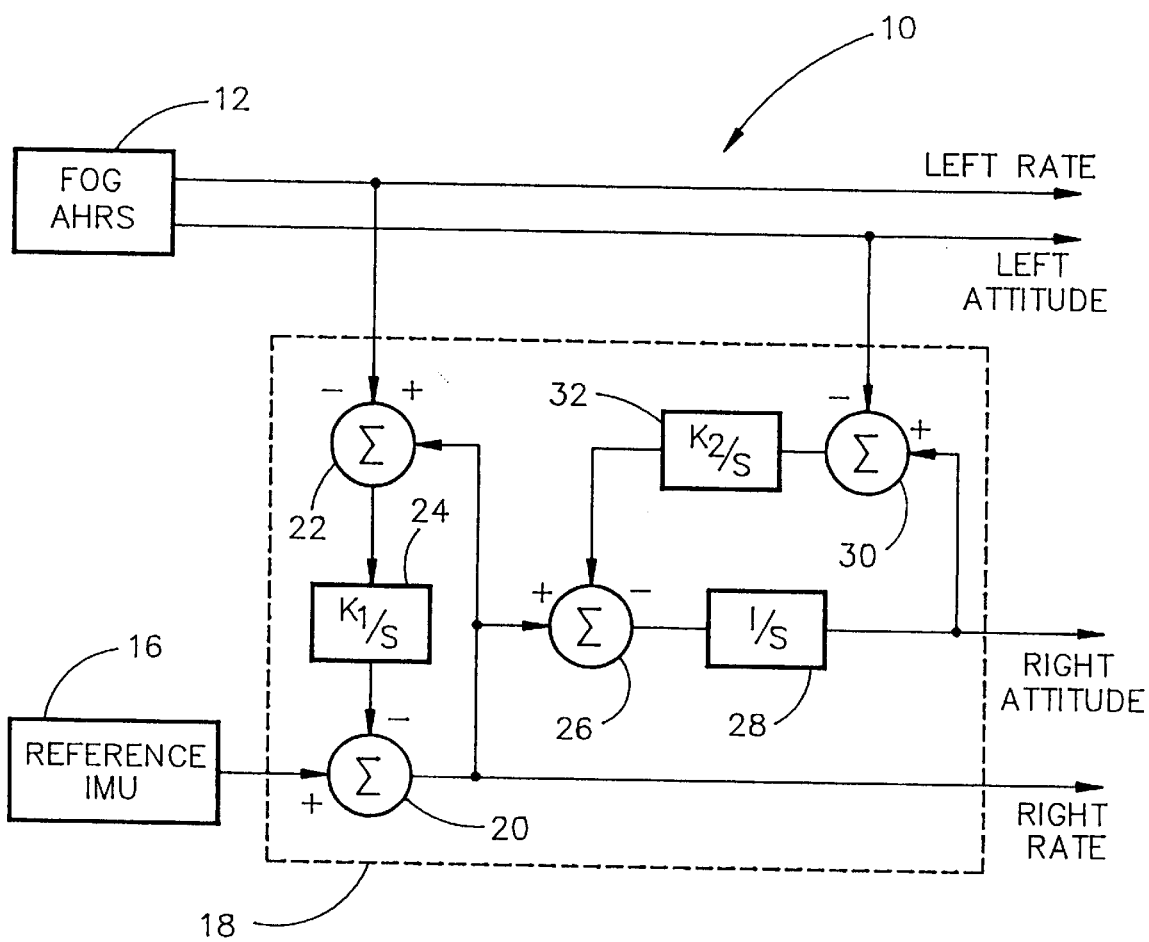
FIG. 2 shows a control flow diagram of the synthesized attitude and rate information.

Referring now to FIG. 2, a control flow diagram of the synthesized attitude and rate information is shown. The left side rate and attitude information may be provided by an attitude and heading reference system ("FOG AHRS) 12 which utilizes a fiber optic gyroscope to detect rotational movement of the aircraft in which it is implemented. The left side FOG AHRS provides a left rotational rate signal ("LEFT RATE") and a left attitude signal ("LEFT ATTITUDE"). The right channel information is synthesized electronically rather than actually being measured. This approach replaces the right side FOG AHRS with a low-cost reference inertial measuring unit (IMU) ("REFERNCE IMU") 16 and a system for correction of long-term rate and acceleration bias, and attitude errors.

The low-cost reference IMU 16 contains low-cost gyros and accelerometers to independently monitor the motion of the vehicle in inertial space. The gyros may be solid state for improved reliability. Commercially available low-cost silicone or quartz micromachined gyros such as those used in automobile systems or piezoceramic gyros such as those utilized in camera stabilization applications may be utilized. To achieve adequate bias stability the reference IMU may need to include temperature compensation or even temperature control. The accuracy characteristics required of the IMU sensors may be determined by the characteristics of the hazardous faults that are to be detected. The compensated sensor short-term errors must be smaller than the faults to be detected.

When combined with synthesizing means 18, the low-cost reference IMU may be utilized in lieu of a second right side FOG AHRS system. The combined reference IMU and synthesizing means may be utilized to provide pseudo-independent attitude and rate information when used in conjunction with a single FOG AHRS to provide a high integrity output needed for such applications as precision approach flight control.

As illustrated in FIG. 2, a single FOG AHRS unit 12 may be utilized to directly provide left side rate and attitude information signals. Synthesizing means 18 may be utilized for synthesizing pseudo-independent attitude, rate of change of attitude, and acceleration information which may serve as a redundant source to the FOG AHRS 12. Here the term pseudo-independent is utilized to indicate that the long-term accuracy is still determined by the left side source, but that the output of the right side system is sufficiently independent to adequately detect hard-over and slow-over faults that can not be detected by other means. Synthesizing means 18 implements a solution for determining a second set of attitude and rate of change of attitude signals. Synthesizing means 18 may comprise an analog processing circuit, a microprocessor or microcontroller, or a digital signal processor, for example.

The output of the reference IMU 16 feeds into a first summing element 20. The output of the first summing element 20 feeds into a second summing element 22 which subtracts the left side rate information signal of the FOG AHRS 12 from the output of summing element 20. The output of summing element 22 is amplified by a first feedback compensation block 24. The compensation block is shown as an integrator having a gain of $K_1$, but may be any filter, appropriate for the intended application, with low gain at the intended slow-over and hard-over error detection frequencies, and high gain at the lower frequencies of the typical expected reference IMU errors. A typical feedback compensation block might include a integrator term to correct long-term errors, a proportional term to improve feedback damping characteristics, and total output limitor that serves to clip, or bound the, output authority of the feedback. A good choice for the gains of the integrator and proportional terms would provide proportional and integral gain ratio that results in a critically damped response to reference IMU errors, with adequately large gain and limiting terms such that the expected long-term errors in the reference IMU rate outputs are sufficiently corrected, but adequately small such that a hazardous fault in the left side FOG AHRS will result in a discrepancy in the right and left rate outputs that persists for an adequate time that the fault is detected by the safety critical systems utilizing the outputs. The output of the feedback compensation block 24 feeds into summing element 20 where it is subtractively combined with the output signal from the reference IMU 16. Such a feedback arrangement provides a synthesized right side rate information signal ("RIGHT RATE") at the output of summing element 20. This RIGHT RATE output has the characteristic of being insensitive to the low frequency errors of the reference IMU 16 (such as slow changes in bias errors due to temperature variation or drift with time), and will also not follow rapidly changing hard-over or slow-over errors from FOG AHRS 12.

The synthesized right side rate information at the output of summing element 20 is tapped off and fed into a third summing element 26. The output of summing element 26 is low pass filtered with a attitude integrator 28. The output of attitude integrator 28 is fed into a fourth summing element 30 from which the left attitude information signal is subtracted. The output of summing element 30 feeds into a third feedback compensation block 32 shown as having a gain of $K_2$. As in the case of feedback compensation block 24, feedback compensation block 32 provides adequately high gain at low frequencies to compensate for attitude errors resulting from the residual bias errors in the compensated right rate signal, but has adequately low gain at higher frequencies of the slow-over and hard-over errors that should be detected from FOG AHRS 12. Again this compensation block may contain an integrator and proportional feedback terms as well as a total output limiting function. Again a good choice of the gains of these terms would produce a critically damped response to a right attitude error, with sufficient output authority to correct for the long-term errors caused by the inaccuracies and bias drift of the reference IMU rate output, but sufficiently low such that (in the event of a hazardous fault in the left side FOG AHRS) the right attitude output will differ from the left attitude output by a sufficiently large amount, and for a sufficiently long time that all safety critical systems comparing the left and right attitude outputs will detect a fault. The output of low pass filter 32 is fed back through attitude integrator 28 by being subtractively combined with the right side rate information signal at summing element 26. The output of attitude integrator 28 thereby provides a synthesized right attitude information signal ("RIGHT ATTITUDE"). The attitude integrator 28 must contain the appropriate functions such as a direction cosine transform or quaterion transform to correctly convert incremental angular rates into attitude angles in the desired coordinate system.

The system of the present invention thus described allows for detection of both hard-over and slow-over errors in the FOG AHRS 12. Very-slow-over induced attitude errors may be detected with a pick-off from the right side attitude indicator, with a bubble level, or using analytic redundancy. Because very-slow-over faults take so long to propagate into hazardous attitude errors, the requirements on any analytical redundancy system are greatly relaxed. This allows the use of fewer auxiliary data sources, and simplified aircraft dynamics models, greatly reducing calibration time and cost, and greatly reducing false fault warnings.

Note that in this embodiment that, without additional fault detection logic in the feedback compensation block 24, the right rate output from 18 will eventually output an erroneous output due to the slaving to the FOG AHRS 12. Logic must be provided to effectively detect and latch the fault state external to the system. In the example of an autopilot system, once the discrepancy in the rate or attitude error induces a fault detection, the autopilot is disengaged until the pilot verifies that the attitude output is correct and reengages the autopilot.

In the embodiment Illustrated in FIG. 2, it is assumed that the reference IMU has sensors for all three axes of aircraft motion. These sensors are either nominally aligned with the vehicle axes, or the proper transformations are performed in the Reference IMU to convert the mounting axes of the sensors to the aircraft axes (typically roll pitch and Yaw).

Figure 3:
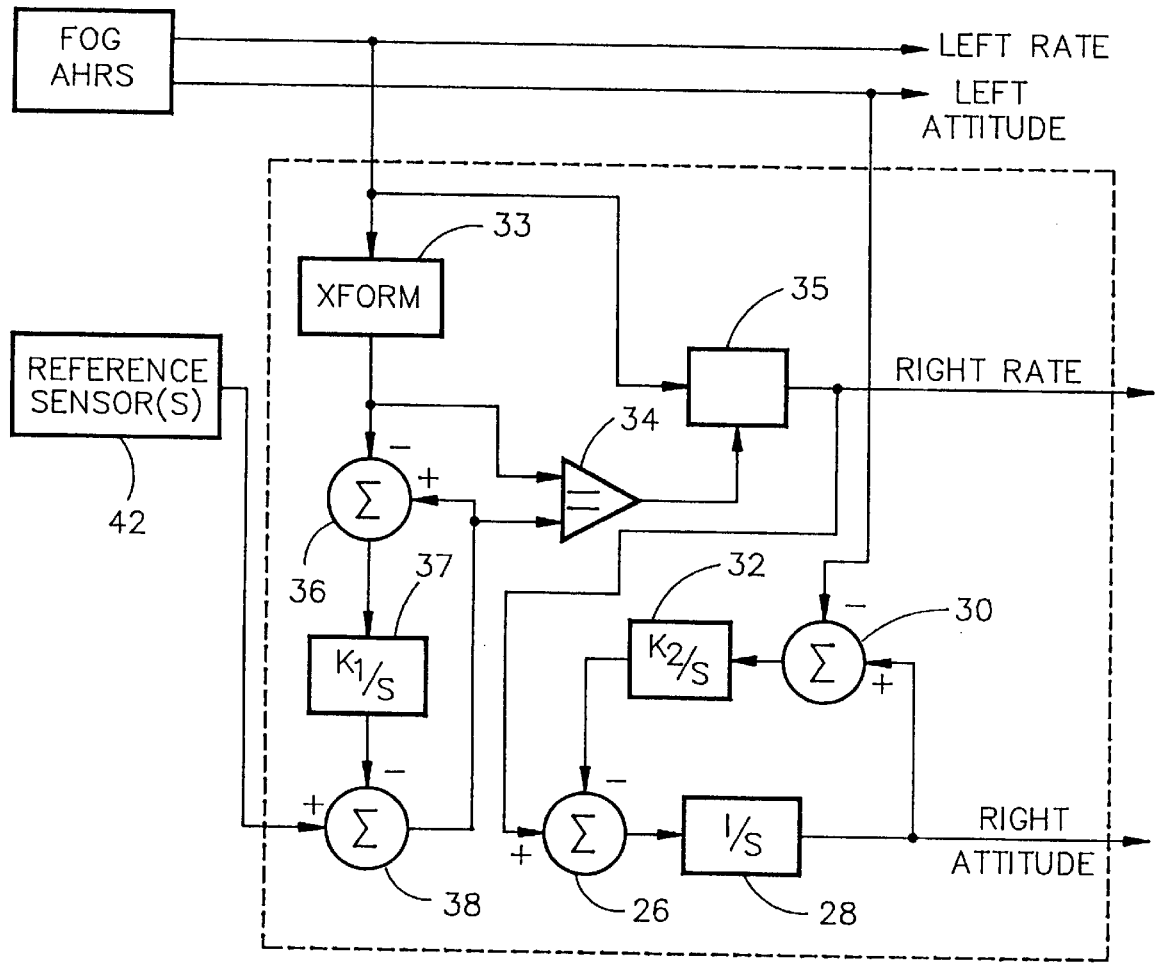
FIG. 3 shows an alternative embodiment of the invention utilizing a reference sensor system with fewer axes of sensitivity than the monitored attitude heading reference system.

Referring now to FIG. 3, a second embodiment may utilize fewer axes of non-precision reference sensors to monitor for the majority of faults in the precision AHRS. FIG. 3 shows a second embodiment of this invention wherein the three-axis rate output from the FOG AHRS 12 is used to compute an estimate for the corrected output of the reference sensors 42. In this embodiment XFORM 33, converts the FOG AHRS 12 LEFT RATE information into the coordinate axis or axes of the sensor(s) in REFERENCE SENSOR(S) 42. The long-term errors of the REFERENCE SENSOR(S) are subtracted out by the output of lowpass filter/integrator block 37 just as they were in the first embodiment. However the CORRECTED SENSOR OUTPUT(S) can not be output directly because they are not in the aircraft coordinates, and may not include all three axes of output. A technique must be used to synthesize a RIGHT SIDE RATE signal. One simple way to perform this is shown on FIG. 2. Comparison block 34 compares the XFORM LEFT and the CORRECTED SENSOR OUTPUTS. If the magnitude of the disagreement of XFORM LEFT and the CORRECTED SENSOR output signals is larger than a specified fault detection threshold, a FAULT signal output is produced by comparison block 34. If the XFORM LEFT and the CORRECTED SENSOR output signals disagree by less than a specified fault detection threshold, a NOFAULT output signal is produced by comparison block 34. Some lowpass filtering may be required in the comparison block, to prevent noise and transport delays from causing false fault signals. The fault detection threshold of the comparison block is determined by the level of attitude rate error that is considered hazardous in the application. The FAULT/NOFAULT flag from the comparison block 34 is fed to the output block 35. If the NOFAULT signal is sent to the right output block 35 the right output block transmits the LEFT RATE as the pseudo-independent RIGHT RATE. If however, FAULT signal is received from comparison block 34, the right output block 35 transmits an appropriate fault output. The form of the fault output will be determined by the needs of the application and the systems utilizing the output signal. In some systems this may for example be a zero or null output combined with bad data flag.

The RIGHT ATTITUDE may be synthesized exactly as in the first embodiment with the exception that the RIGHT RATE signal is received from output block 35 instead of summing element 20. The fault condition output from the RIGHT RATE output from right output block 35 should produce an appropriate fault output in the RIGHT ATTITUDE. One possible implementation would be to have summing element 26 pass along the fault detected flag in its signal to attitude integrator block 35, which in tern would produce a zero or null attitude output flagged with an error.

Figure 4:
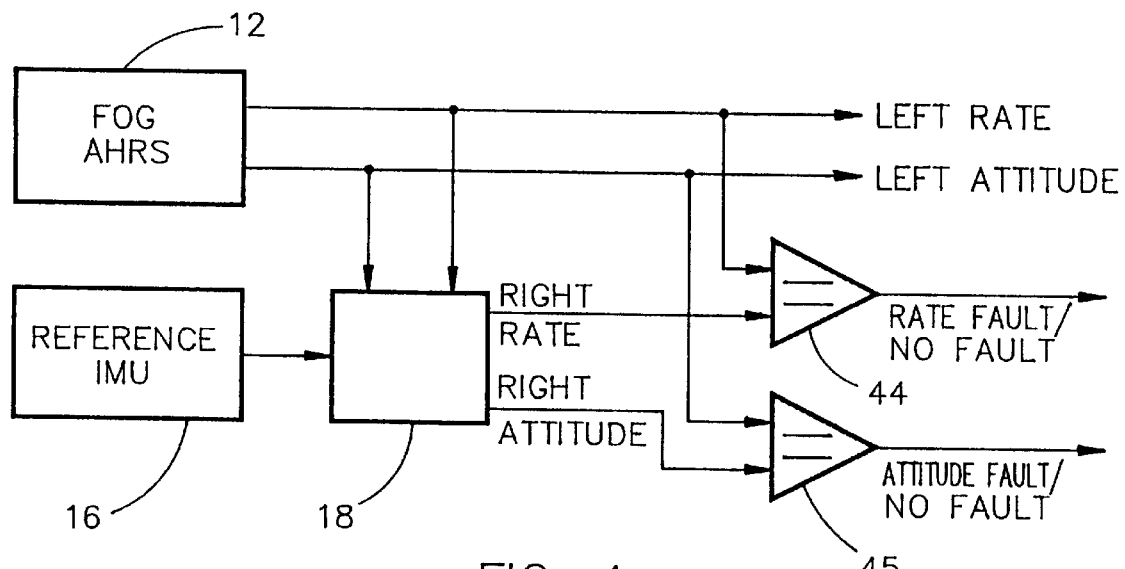
FIG. 4 shows an alternative embodiment of the invention which produces a single set of rate and attitude signals as well as data integrity flag signals.

Referring now to FIG. 4, a third embodiment of the invention is shown in FIG. 4. This embodiment may be utilized for applications requiring a single attitude output and a data integrity flag. For example, a single channel autopilot may use the LEFT RATE and LEFT ATTITUDE signals as inputs and the ATTITUDE FAULT/NOFAULT and RATE FAULT/NOFAULT flags as a control signal to disengage the autopilot and warn the pilot if a fault occurs.

In this embodiment the FOG AHRS block 12, the REFERENCE IMU block 16, and the synthesizing means block 18 are equivalent to those shown in FIG. 2. Alternatively blocks 16 and 18 may be replaced by blocks 42 and 43 respectively from FIG. 3, as they produce substantially equivalent outputs.

Comparison block 44 is used to detect any hazardous discrepancy in the LEFT RATE and RIGHT RATE signals, and comparison block 45 is used to detect any hazardous discrepancy in the LEFT ATTITUDE and RATE ATTITUDE signals.

Comparison block 44 compares the LEFT RATE and the pseudo independent RIGHT RATE outputs. If the magnitude of the disagreement of LEFT RATE and the RIGHT RATE output signals disagree by more than a specified fault detection threshold, a FAULT signal output is produced by comparison block 44. If the LEFT RATE and the pseudo independent RIGHT RATE output signals disagree by less than a specified fault detection threshold, a NOFAULT output signal is produced by comparison block 44. Some lowpass filtering may be required in the comparison block, to prevent noise and transport delays from causing false fault signals. The fault detection threshold of the comparison block and filtering time constants are determined by the level of attitude rate error that is considered hazardous in the application.

Comparison block 45 compares the LEFT ATTITUDE and the pseudo independent RIGHT ATTITUDE outputs. If the magnitude of the disagreement of LEFT ATTITUDE and the RIGHT ATTITUDE output signals is larger than a specified fault detection threshold, a FAULT signal output is produced by comparison block 45. If the LEFT ATTITUDE and the pseudo independent RIGHT ATTITUDE output signals disagree by less than a specified fault detection threshold, a NOFAULT output signal is produced by comparison block 45. Some lowpass filtering may be required in the comparison block, to prevent noise and transport delays from causing false fault signals. The fault detection threshold of the comparison block and filtering time constants are determined by the level of attitude error that is considered hazardous in the application.

In both comparison blocks 44 and 45 additional logic may be required in some applications. For example the FAULT output may be latched such that the FAULT condition persists until it is expressly reset by the pilot or other fault management system. Also in some low-dynamics applications, such as flight control for a stable low-performance aircraft, timing logic may be added such that the FAULT output is only transmitted after the comparator as a sustained error (outside of the fault bounds) for loner than some period of time, such as one second. The timing logic serves to minimize false FAULT flags due to nonhazardous perturbations in the attitude outputs. The time constant of the timer and the bandwidth of the comparator filter must be determined by a safety analysis for the particular application.

Figure 5:
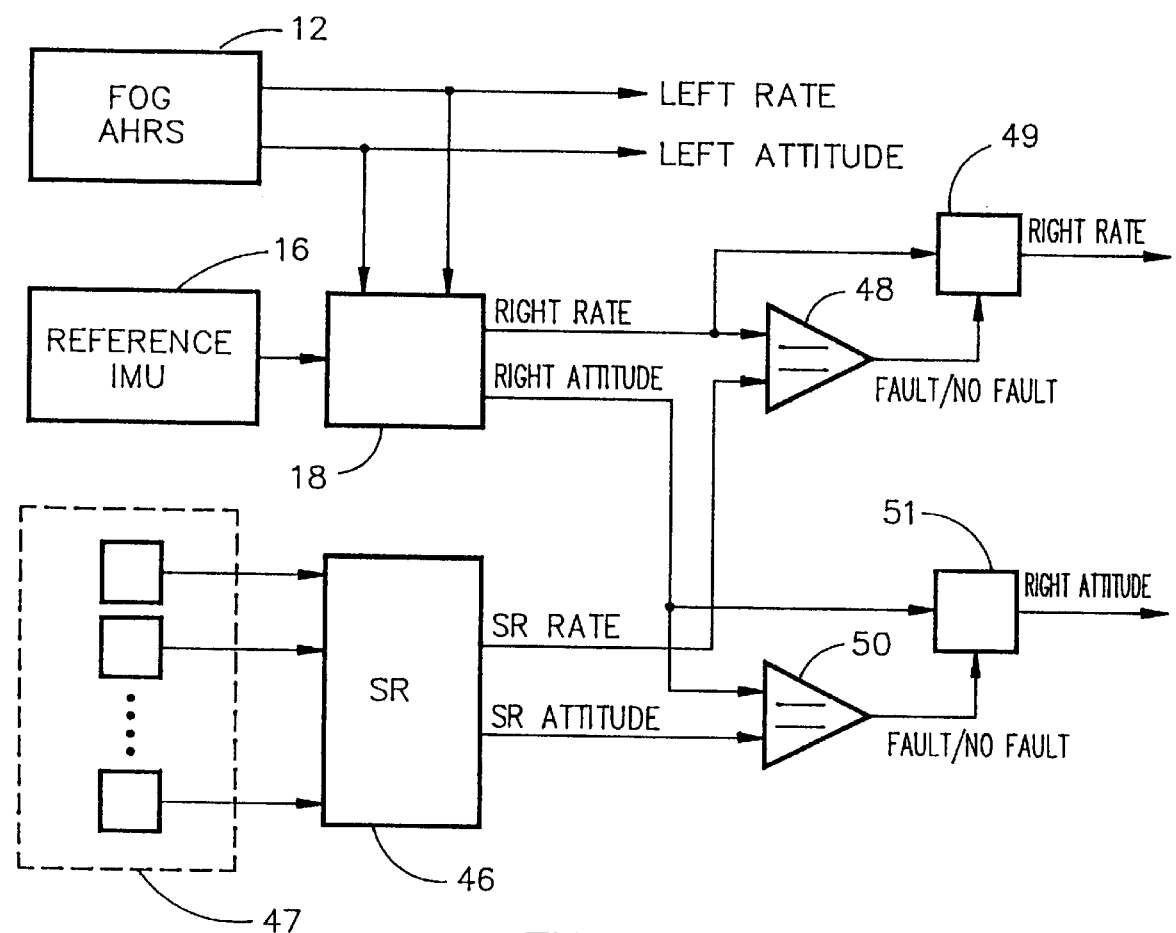
FIG. 5 shows an example of how analytic redundancy may be added to the invention to detect very-slow-over failures in the AHRS.

Referring now to FIG. 5, a fourth embodiment of the invention is shown in FIG. 5. In this embodiment a synthetic redundancy function 46 is added and utilized to verify the right side synthesized output.

In this embodiment the FOG AHRS block 12, the REFERENCE IMU block 16, and the synthesizing means block 18 are equivalent to those shown in FIG. 2. Alternatively blocks 16 and 18 may be replaced by blocks 42 and 43 respectively from FIG. 3, as they produce substantially equivalent outputs.

Synthetic redundancy module 46 utilizes one or more inputs from a group of sensor systems 47. These sensor systems may include one or more of the following: air data system with outputs such as air speed, altitude, and rate of climb/decent; global positioning receiver with outputs such as position and velocity; an independent magnetic compass system with magnetic heading output; inclinometer or electrolytic tilt sensor with inertial attitude angle output; angle of attack sensors; systems that sense flight control commands or control surface positions; or any other sensor system available, and sufficiently independent from the AHRS 12 and reference IMU 16, such that it may be used as a source of independent information. The synthetic redundancy module 46 combines these sensor inputs with a simplified model of the vehicle dynamics and estimates a synthetic rate output SR RATE and a synthetic attitude output SR ATTITUDE. Because the synthetic outputs are only used to detect long-term errors in the FOG AHRS (as observed in the RIGHT RATE OUTPUT), the model can be more simple and requires less custom tuning for individual vehicle types than if the SR RATE and SR ATTITUDE were intended for direct use as right side rate and attitude signals.

The RIGHT RATE and SR RATE signals are fed into comparison block 48. Comparison block 48 compares the RIGHT RATE and SR RATE outputs. If the magnitude of the disagreement of LEFT RATE and the RIGHT RATE output signals is larger than a specified fault detection threshold, a FAULT signal output is produced by comparison block 48. If the RIGHT RATE and SR RATE output signals disagree by less than a specified fault detection threshold, a NOFAULT output signal is produced by comparison block 48. Because this comparison block is intended to detect only long-term errors in the RIGHT RATE output only long duration errors should produce the FAULT signal output. A timer or lowpass filter should be provided at the output of the comparison block with sufficient time constant such that short-term errors in the SR RATE command do not cause a FAULT output signal. The time constant and fault detection threshold are determined by a safety analysis and by the bias correction time constant in synthesizing means block 18. The time constant must be sufficiently short such that a fault in FOG AHRS 12 does not introduce and unacceptably large error in the RIGHT RATE signal.

The FAULT/NOFAULT signal for comparison block 48 is fed into output block 49 as a control signal. If NOFAULT is received the output select block 49 transmits RIGHT RATE as the verified output RIGHT RATE*. If the FAULT control signal is received the output is set to an appropriate fault value as in block 35 in FIG. 3.

The RIGHT ATTITUDE and SR ATTITUDE signals are fed into comparison block 50. Comparison block 50 compares the RIGHT ATTITUDE and SR ATTITUDE outputs. If the magnitude of the disagreement of LEFT ATTITUDE and the RIGHT ATTITUDE output signals is larger than a specified fault detection threshold, a FAULT signal output is produced by comparison block 50. If the RIGHT ATTITUDE and SR ATTITUDE output signals disagree by less than a specified fault detection threshold, a NOFAULT output signal is produced by comparison block 50. Because this comparison block is intended to detect only long-term errors in the RIGHT ATTITUDE output, only long duration errors should produce the FAULT signal output. A timer or lowpass filter should be provided at the output of the comparison block with sufficient time constant such that short-term errors in the SR ATTITUDE command do not cause a FAULT output signal. The time constant and fault detection threshold are determined by a safety analysis and by the attitude correction time constant in synthesizing means block 18. The time constant must be sufficiently short such that a fault in FOG AHRS 12 does not introduce and unacceptably large error in the RIGHT ATTITUDE signal.

The FAULT/NOFAULT signal for comparison block 50 is fed into output block 51 as a control signal. If NOFAULT is received the output select block 51 transmits RIGHT ATTITUDE as the verified output RIGHT ATTITUDE*. If the FAULT control signal is received the output is set to an appropriate fault value such as a zero or null output with a data fault flag.

It is believed that the synthesized attitude and heading inertial reference of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A high integrity sensor system consisting of:
    a precision sensor system, a less precise secondary sensor system, and means to allow detection of a fault in the precision sensor system by utilizing signals from both sensor systems, wherein said means to allow detection of a fault utilizes a short-term stability characteristic of said secondary sensor system to detect faults while concomitantly correcting longer-term errors in said secondary sensor system.

2. Claim 1 wherein the means to allow detection of a fault in the precision sensor system consists of a system to produce a pseudo-independent output by utilizing data from both said primary and secondary sensor systems.

3. Claim 1 wherein said secondary sensor system has fewer axes of sensitivity than said precision sensor system, and wherein means are provided whereby at least some faults of the precision sensor system are detected.

4. Claim 2 wherein said secondary sensor system has fewer axes of sensitivity than said precision sensor system, and wherein means are provided whereby at least some of the faults of the precision sensor system are detected.

5. Claim 1 wherein said precision sensor system is an attitude and heading reference system and wherein said secondary sensor system is a reference inertial measurement unit.

6. An inertial reference system for determining the attitude and rate of change of attitude of a vehicle, comprising:
    an attitude and heading reference system including at least three precision gyroscopes and an electronics system for providing attitude and rate of change of attitude information of the vehicle about a first directional axis; and
    a second reference system for providing a reference signal, said second reference system provides an independent measurement of attitude and rate of change of attitude information of the vehicle; and
    means, operationally connected to said attitude and heading reference system and to said second reference system, for synthesizing attitude and rate of change of attitude information of the vehicle about a second directional axis of the vehicle from said attitude and rate of change of attitude and from said reference signal.

* * * * *